(12) United States Patent
Pinho et al.

(10) Patent No.: US 12,479,870 B2
(45) Date of Patent: Nov. 25, 2025

(54) BASE-MODIFIED CYTIDINE NUCLEOTIDES FOR LEUKEMIA THERAPY

(71) Applicant: MEDIVIR AB, Huddinge (SE)

(72) Inventors: Pedro Pinho, Huddinge (SE); Björn Klasson, Huddinge (SE); John Ohd, Huddinge (SE); Mark Albertella, Huddinge (SE)

(73) Assignee: MEDIVIR AB, Huddinge (SE)

( * ) Notice: Subject to any disclaimer, the term of this patent is extended or adjusted under 35 U.S.C. 154(b) by 0 days.

(21) Appl. No.: 18/670,555

(22) Filed: May 21, 2024

(65) Prior Publication Data

US 2024/0309031 A1   Sep. 19, 2024

Related U.S. Application Data

(63) Continuation of application No. 17/254,099, filed as application No. PCT/SE2019/050594 on Jun. 20, 2019, now abandoned.

(60) Provisional application No. 62/825,679, filed on Mar. 28, 2019.

(30) Foreign Application Priority Data

Jun. 21, 2018   (SE) .................................. 1850765-7
May 13, 2019   (JP) ................................. 2019-090760

(51) Int. Cl.
*C07F 9/6558*   (2006.01)
*A61P 35/02*   (2006.01)

(52) U.S. Cl.
CPC .......... *C07F 9/65586* (2013.01); *A61P 35/02* (2018.01)

(58) Field of Classification Search
CPC .................................................. C07F 9/65586
See application file for complete search history.

(56) References Cited

U.S. PATENT DOCUMENTS

2009/0099136 A1   4/2009   Sofia et al.

FOREIGN PATENT DOCUMENTS

| EP | 1370270 B1 | 12/2009 |
|---|---|---|
| EP | 2138179 A1 | 12/2009 |
| EP | 2623104 A1 | 8/2013 |
| JP | 2000501714 A | 2/2000 |
| JP | 2004525142 A | 8/2004 |
| JP | 4313570 B2 | 8/2009 |
| JP | 2017526677 A | 9/2017 |
| WO | 2000057861 A2 | 10/2000 |
| WO | 2004052369 A1 | 6/2004 |
| WO | 2016030335 A1 | 3/2016 |
| WO | 2017151044 A1 | 9/2017 |

OTHER PUBLICATIONS

Bankar, A et al, "5-Fluorotroxacitabine displays potent anti-leukemic effects and circumvents resistance to Ara-C." Poster, ASH 60th Annual Meeting and Exposition, 2018, San Diego, California.
Bankar, A et al, "5-Fluorotroxacitabine Displays Potent Anti-Leukemic Effects and Circumvents Resistance to Ara-C." The American Society of Hematology, 2018, vol. 132, 1:3939.
International Search Report for International Application No. PCT/SE2019/050594, Issued on Aug. 2, 2019.
Pinho, P et al, "Protides of 5-Fluorotroxacitabine Display Potent Anti-Proliferative Properties and Circumvent Deoxycytidine Kinase-Mediated Resistance Associated with Cytotoxic Cytidine Analogues; a Novel Approach for Acute Myeloid Leukemia." Poster #3497, ASH 60th Annual Meeting and Exposition, 2018, San Diego, California, USA.
Pinho, P et al, "Protides of 5-Fluorotroxacitabine Display Potent Ant••-Proliferative Properties and Circumvent Deoxycytidine Kinase-Mediated Resistance Associated with Cytotoxic Cytidine Analogues; A Novel Approach for Acute Myeloid Leukemia." American Society of Hematology, 2018 vol. 132, 1:3497.
Remington: The Science and Practice of Pharmacy, Nineteenth Edition, vol. 1, pp. 710-712 and pp. 1524-1528.
Roboz et al, "Phase I/II Study of Continuous-Infusion Troxacitable in Refractory Acute Myeloid Leukemia", Journal of Clinical Oncology, vol. 25, No. 1, pp. 10-15, Issued Jan. 1, 2007, Abstract and Table 5.
Swedish Search Report for Swedish Application No. 1850765-7, Issued on Jan. 14, 2019.
Translation of Japanese Office Action issued on Feb. 21, 2023 for corresponding Japanese Patent Application No. 2019-090760.

*Primary Examiner* — Shobha Kantamneni
(74) *Attorney, Agent, or Firm* — Susan W. Gorman; Intelink Law Group, PC

(57) ABSTRACT

Compounds of the formula I

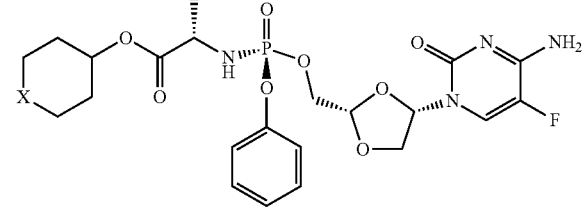

wherein X is a bond or —CH$_2$, and pharmaceutically acceptable salts thereof are useful in the parenteral treatment of leukemia, myelodysplastic syndrome or lymphoma, especially in patients presenting with cytarabine resistance and/or over 60 years of age.

17 Claims, 1 Drawing Sheet

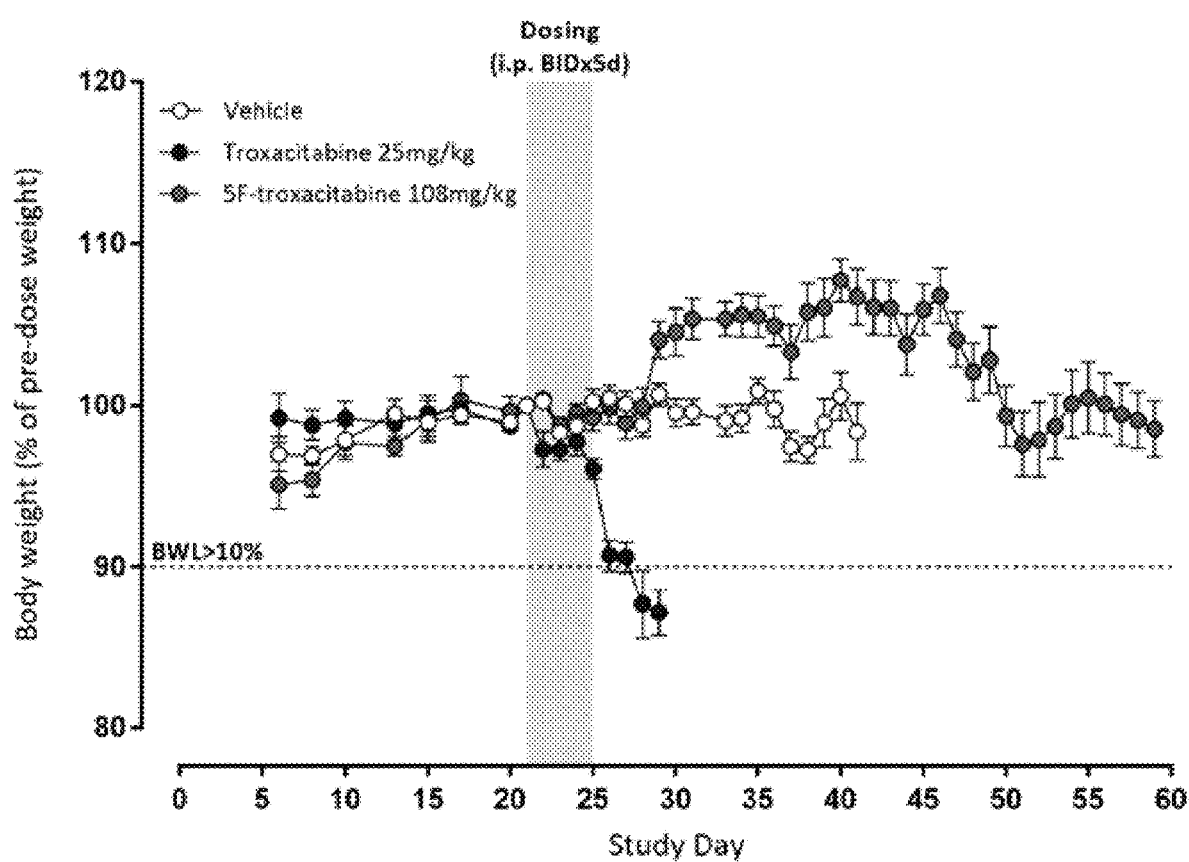

BASE-MODIFIED CYTIDINE NUCLEOTIDES FOR LEUKEMIA THERAPY

This Nonprovisional application is a Continuation application of co-pending application Ser. No. 17/254,099 which was filed on Dec. 18, 2020, which is the National Phase Under 35 USC § 371 of PCT International Application No. PCT/SE2019/050594 filed on Jun. 20, 2019, which claims priority under 35 U.S.C. § 119 on Patent Application No. 1850765-7 filed in Sweden on Jun. 21, 2018, on Patent Application No. 62/825,679 filed in the United States on Mar. 28, 2019, and on Patent Application No. 2019-090760 filed in Japan on May 13, 2019, the entire contents of each of which are hereby incorporated by reference.

FIELD OF THE INVENTION

This invention relates to novel base-modified cytidine nucleotides and their use in treating cancers of the hematopoetic (white blood) ell lineages.

BACKGROUND TO THE INVENTION

International patent application WO92/14729 describes enantiomeric synthesis techniques allowing the resolution of the various diastereomers of dioxolane cytidines and their 5'-fluoro analogs. Certain of the diastereomers are stated to be useful in the treatment of retroviral infections such as HIV.

International patent application WO97/21706 describes further enantiomeric syntheses, and exemplifies the L-nucleoside 5'-fluorotroxacitabine (then known as (-)-dOTFC), which is stated to be active against HIV.

International patent application WO00/57861 describes a 12-person clinical trial of troxacitabine in advanced, cytarabine-treatment failure, leukemia:

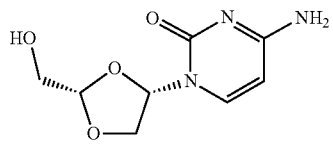 [SMILES: Nc1ccn([C@@H]2CO[C@H](CO)O2)c(=O)n1]

Four out of the 12 patients showed a transient decrease in peripheral blood and marrow blasts. The 5-fluorocytidine analog of troxacitabine, and various simple 5'-phosphate esters, are generically embraced by the disclosure of WO00/21706, but are not otherwise described or prepared. Troxacitabine entered phase II/III clinical trials in acute myeloid leukemia in August 2005, but the trial was prematurely terminated by the independent data and safety monitoring board. Troxacitabine has never been registered as a drug in any indication and 5-fluorotroxacitabine has not entered clinical trials at all.

International patent application WO2016/030335 discloses phosphoramidate esters of troxacitabine which are orally administered and targeted to the liver. Upon reaching the liver, the phosphoramidates are taken up preferentially by hepatocellular carcinoma cells and metabolized, thereby trapping the troxacitabine phosphate in the liver. WO2016/030335 additionally describes the preparation of two 5-fluorotroxacitabine phosphoramidates (the structures are depicted in Comparative Example 1, below) and discloses their activity in hepatic carcinoma lines.

Leukemia, also spelled leukaemia, is a group of cancers of the hematopoetic cell lineage that usually begin in the bone marrow and result in high numbers of abnormal white blood cells. These white blood cells are not fully developed and are called blasts or leukemia cells. Symptoms may include bleeding and bruising problems, feeling tired, fever, and an increased risk of infections. Diagnosis is typically made by blood tests or bone marrow biopsy. Leukemia thus afflicts a widely dispersed tissue type reticulating in the blood and largely generated in the bone marrow. This should be contrasted with the hepatocellular cancers being treated in WO2016/030335 which are localized as solid tumours in a specific organ.

The exact cause of leukemia is unknown. A combination of genetic factors and environmental (non-inherited) factors are believed to play a role. Risk factors include smoking, ionizing radiation, some chemicals (such as benzene), prior chemotherapy, and Down syndrome. People with a family history of leukemia are also at higher risk. There are four main types of leukemia—acute lymphoblastic leukemia (ALL), acute myeloid leukemia (AML), chronic lymphocytic leukemia (CLL) and chronic myeloid leukemia (CML)—as well as a number of less common types.

Myelodysplastic syndromes (MDS) is a group of clonal bone marrow disorders characterized by ineffective hematopoiesis resulting in cytopenias and an increased risk of developing acute myeloid leukemia (AML). Symptoms are generally to shortage of normal blood cells and may include fatigue, infectious episodes, bleeding and bruising problems. Diagnosis is made by bone marrow assessment. Prior chemotherapy, radiation, and exposure to chemicals such as benzene are risks factors, most in most cases, no apparent cause can be found.

Lymphomas a general term for malignancies in the lymphatic system which is part of the immune defense. Symptoms depend on the location of the tumor and the lymphoma subtype, but may include enlargement of lymph nodes or spleen, shortage of normal blood cells, fever, weight loss and night sweats. In most cases, no underlying cause is found, but some subtypes are associated with certain infectious or autoimmune conditions.

Leukemias, myelodysplastic syndromes and lymphomas both belong to a broader group of tumors that affect the blood, bone marrow, and lymphoid system, known as tumors of the hematopoietic and lymphoid tissues.

Treatment of leukemia, MDS and lymphoma may involve some combination of chemotherapy, radiation therapy, targeted therapy, and bone marrow transplant, in addition to supportive care and palliative care as needed. The success of treatment depends on the type of cancer and the age of the person. Outcomes have generally improved in the developed world. For leukemia, the average five-year survival rate is 57% in the United States. In children under 15, the five-year survival rate is greater than 60 to 85%, depending on the type of leukemia. In children with acute leukemia who are cancer-free after five years, the cancer is unlikely to return.

In 2015, leukemia was present in 2.3 million people and caused 353,500 deaths, as reported by the WHO. In 2012, it newly developed in 352,000 people. It is the most common type of cancer in children, with three quarters of leukemia cases in children being the acute lymphoblastic type. However, about 90% of all leukemias are diagnosed in adults, with AML and CLL being most common in adults.

BRIEF DESCRIPTION OF THE INVENTION

The present invention arises from the discovery that a novel base-modified cytidine nucleotide within the generic scope of the above described liver targeting patent has properties fitting it for use in the parenteral treatment of leukemias.

A first aspect of the invention thus provides a compound of the formula I:

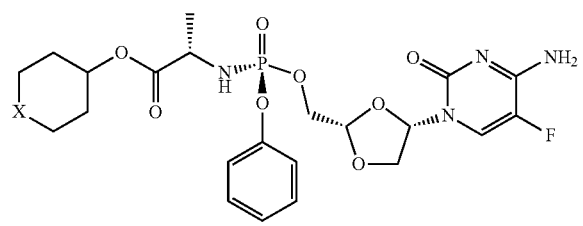

wherein X is a bond or —CH₂— or a pharmaceutically acceptable salt thereof.

An embodiment of the invention thus provides a compound of the formula IA:

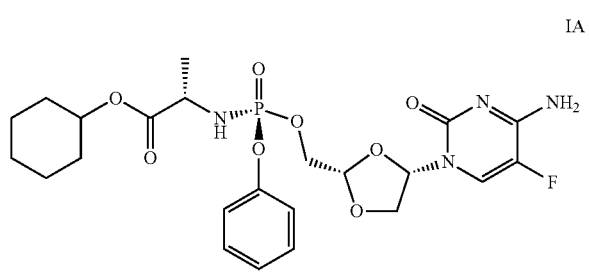 [SMILES: C[C@H](N[P@](=O)(OC[C@H]1OC[C@@H](n2cc(F)c(N)nc2=O)O1)Oc1ccccc1)C(=O)OC1CCCCC1]

or a pharmaceutically acceptable salt thereof.

Another embodiment of the invention provides a compound of the formula IB:

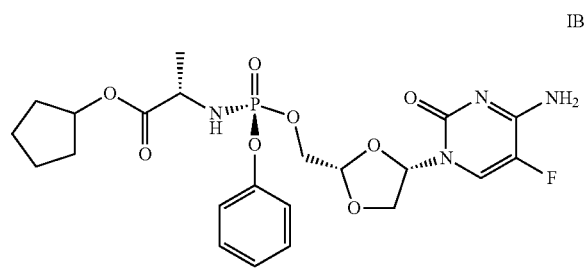 [SMILES: C[C@H](N[P@](=O)(OC[C@H]1OC[C@@H](n2cc(F)c(N)nc2=O)O1)Oc1ccccc1)C(=O)OC1CCCC1]

or a pharmaceutically acceptable salt thereof.

A further aspect of the invention provides the parenteral use of the compound, or pharmaceutically acceptable salt of the formula I, IA or IB in the treatment of a leukemia, myelodysplastic syndrome or a lymphoma. Related aspects include the use of the compound, or pharmaceutically acceptable salt of formula I, IA or IB in the manufacture of a parenteral medicament for the treatment of a leukemia, myelodysplastic syndrome or a lymphoma and a method for the treatment of a leukemia, myelodysplastic syndrome or a lymphoma comprising the parenteral administration of an effective amount of a compound, salt of the formula I, IA or IB to a mammal afflicted with that leukemia, myelodysplastic syndrome or lymphoma.

For clarity, the compounds and salts of formula I, IA and IB may hereafter be referred to simply as the compounds of the invention.

The compounds of the invention show an unexpectedly beneficial efficacy/toxicity balance when applied to leukemias of the lymphocytic and myelogenous types, and can be used as medicine in the treatment of warm-blooded animals, particularly humans, having such cancers. Lymphocytic cancers to which the invention may be applied include acute lymphoblastic leukemia (ALL), chronic lymphocytic leukemia (CLL), hairy cell leukemia (HCL), T cell lymphoma, diffuse large B-cell lymphoma, Burkitt lymphoma, lymphoblastic lymphoma, mantle cell lymphoma, follicular lymphoma. Marginal zone lymphoma and Waldenstrom's macroglobulinemia. Myelogenous malignancies to which the invention may be applied include acute myelogenous leukemia (AML), chronic myelogenous leukemia (CML), chronic myelomonocytic leukemia (CMML), juvenile myelomonocytic leukemia and myelodysplastic syndromes. Other leukemias include hairy cell leukemia (HCL).

Treatment of AML is a particular focus of the invention, especially in the elderly (≥60 years), who are generally not robust enough for conventional high intensity Standard of Care (SoC). Current SoC can be summarised:

>60 remission induction: cytarabine (low dose) and anthracycline/mitoxantrone, hypomethylating regimes, clofarabine±cytarabine.

>60 post remission consolidation: repeated remission therapy, high dose cytarabine (if eligible=good status, normal renal function, better risk or normal karyotype with favourable molecular markers), hypomethylating regimens.

>60 relapsed/refractory: no general SoC, poor prognosis, various last resort regimens combining available chemotherapeutics: cladribine, cytarabine, mitoxantrone, fludarabine, idarubicin, etoposide, clofarabine, azacitidine, decitabine Clearly there is a need for novel chemotherapeutic which is more tolerable than the current cornerstone of leukemia therapy, cytarabine.

Elderly AML patients are further often associated with cytarabine resistance, whereas the compounds of the invention typically retain activity against common cytarabine resistance mechanisms, eg increased cytidine deaminase (CDA) expression, reduced deoxycytidine kinase (dCK) expression and the like.

In another aspect, the invention provides a pharmaceutical composition comprising a compound or pharmaceutically acceptable salt of Formula I, IA or IB in association with a pharmaceutically acceptable adjuvant, diluent, excipient or carrier, which is adapted for parenteral administration.

In a further aspect, the invention provides the pharmaceutical composition as defined in the immediately preceding paragraph for use in the treatment of a leukemia, which further comprises one or more additional therapeutic agents, typically anticancer agents. Such additional therapeutic agents include those SoC for the ≥60 age group, as well as those SOC earmarked for younger, more robust patient groups. Examples include cytarabine, clofarabine, mitoxantrone, anthracyclines (idarubicin, daunorubicin) and hypomethylating regimens (5-azacytabine, decitabine).

The pharmaceutical compositions mentioned above will typically contain an effective amount (e.g. for humans) of the compound or pharmaceutically acceptable salt of Formula I, IA or IB, although nominally sub-therapeutic amounts of the compound of the invention may nevertheless be of value when intended for use in combination with other anti-leukemic agents or in multiple doses.

In this context a therapeutically effective amount is an amount sufficient to produce an intended result. The therapeutically effective amount will vary depending on individual requirements in each particular case. Features that influence the dose are e.g. the severity of the disease to be treated, age, weight, general health condition etc. of the subject to be treated. With respect to an anti-cancer effect, that effect may be inhibition of further leukemic or lymphoma growth, or producing cell death in the affected tissue, which may include the bone marrow and other sites of white blood cell genesis, resulting in a shrinkage of the malignant cell population or preventing the regrowth of malignantcells after the patient's condition is in remission.

In a further aspect, the present invention provides a compound or pharmaceutically acceptable salt of Formula (I) for use in the treatment of a leukemia, myelodysplastic syndrome or lymphoma in a mammal, including humans, in combination with one or more additional cancer treatment(s) such as other anti-cancer drugs (examples of which are provided above), surgery or immunotherapy. Other additional treatments include immunooncology agents such as checkpoint inhibitors for example PD1/PD-L1 monoclonals such as pembrolizumab or nivolumab.

In one embodiment, an additional anticancer treatment is one or more other nucleoside analogue(s) which exhibit potent antitumor activity. Examples include cytarabine, clofarabine, and hypomethylating regimens (5-azactyibine, decitabine).

The compounds of the present invention may be formulated into various pharmaceutical forms for administration purposes. As appropriate compositions, there may be cited compositions conventionally used for the galenic formulation of lipophilic (and therefore sparingly soluble in aqueous preparations) ionic moiety-containing actives, such as the compounds of the invention. To prepare the pharmaceutical compositions of this invention, an effective amount of the particular compound, optionally in addition salt form, as the active ingredient is combined in intimate admixture with a pharmaceutically acceptable carrier, which carrier may take a wide variety of forms depending on the form of preparation desired for administration.

The compound or pharmaceutically acceptable salt of Formula I, IA or IB may be formulated for parenteral administration (e.g. by injection, for example bolus injection or continuous infusion) and may be presented in unit dose form in ampoules, pre-filled syringes, small volume infusion or in multi-dose containers with an added preservative. The compositions may take such forms as suspensions, solutions, or emulsions in oily or aqueous vehicles, and may contain formulation agents such as suspending, stabilizing and/or dispersing agents. Alternatively, the active ingredient may be in powder form, obtained by aseptic isolation of sterile solid or by lyophilisation from solution, for constitution with a suitable vehicle, e.g. sterile, pyrogen-free water, before use.

It is especially advantageous to formulate the aforementioned pharmaceutical compositions in unit dosage form for ease of administration and uniformity of dosage. Unit dosage form as used herein refers to physically discrete units suitable as unitary dosages, for example a vial, flask or pouch containing a defined amount of the compound of Formula I, IA or IB dissolved or suspended in a defined volume of a liquid carrier, typically a polar aprotic solvent such as dimethylacetamide (DMA), dimethylsulfoxide (DMSO) or N-methylpyrrolidone (NMP), optionally containing further solubilizers.

The unit dose will typically be in the form of a predetermined quantity of active ingredient which is made up ex tempore by dilution with an aqueous vehicle to an infusion pouch or other form of dosage unit immediately before administration, or at least within 1 hour, 3 hours, 12 hours or 24 hours ahead of administration. Suitable aqueous vehicles include saline, such as 0.9% saline or 0.45% saline, glucose solution or water-for-infusion (WFI). It is generally desirable to make the ready infusion solution substantially isotonic with blood, ie between 200 mosm/l and 600 mosm/l, preferably 250-400 mosm/I. When formulating a solution for administration by pump unit, ie a central venous administration device, the proportion of aqueous vehicle will generally be substantially less than if administering through a peripheral vein. In certain embodiments intended for CVAD, the formulation does not require ex tempore dilution.

The formulation may also comprise one or more pharmaceutically acceptable solubilizers, e.g. a pharmaceutically acceptable non-ionic solubilizers. Solubilizers may also be called surfactants. Illustrative solubilizers include polyethoxylated fatty acids and fatty acid esters and mixtures thereof. Suitable solubilizers include polyethoxylated castor oil (e.g. that sold under the trade name Kolliphor® ELP); or polyethoxylated stearic acid (e.g. that sold under the trade names Solutol® or Kolliphor® HS15); or polyethoxylated (e.g. polyoxyethylene (20)) sorbitan monooleate, (e.g. that are sold under the trade names Polysorbate 80 or Tween® 80). Tween® 80, a polyethoxylated sorbitan monooleate is often the solubiliser of choice. In certain preferred embodiments, the formulation comprises more than one pharmaceutically acceptable solubilizer.

In general, it is contemplated that an effective daily amount would be from about 0.01 to about 700 mg/kg, or about 0.5 to about 400 mg/kg, or about 1 to about 250 mg/kg, or about 2 to about 200 mg/kg, or about 10 to about 150 mg/kg body weight. It may be appropriate to administer the required dose as two, three, four or more sub-doses at appropriate intervals throughout the day. Said sub-doses may be formulated as unit dosage forms, for example, containing about 1 to about 5000 mg, or about 50 to about 3000 mg, or about 100 to about 1000 mg, or about 200 to about 600 mg, or about 100 to about 400 mg of active ingredient per unit dosage form.

The compounds of the present invention may exhibit an anticancer effect alone and/or enhance the ability of another anti-cancer agent to exhibit an anticancer effect.

The compounds of the invention are represented as a defined stereoisomer, notably S at the phosphorous atom according to the Cahn-Ingold-Prelog priority rules. The absolute configuration of such compounds can be determined using art-known methods such as, for example, X-ray diffraction or NMR and/or implication from start materials of known stereochemistry. Pharmaceutical compositions in accordance with the invention will preferably comprise substantially stereoisomerically pure preparations of the indicated stereoisomer.

Pure stereoisomeric forms of the compounds and intermediates as mentioned herein are defined as isomers substantially free of other enantiomeric or diastereomeric forms of the same basic molecular structure of said compounds or intermediates. In particular, the term "stereoisomerically pure" concerns compounds or intermediates having a stereoisomeric excess of at least 80% (i.e. minimum 90% of one isomer and maximum 10% of the other possible isomers) up to a stereoisomeric excess of 100% (i.e. 100% of one isomer and none of the other), more in particular, compounds or intermediates having a stereoisomeric excess of 90% up to 100%, even more in particular having a stereoisomeric excess of 94% up to 100% and most in particular having a stereoisomeric excess of 97% up to 100%. The terms "enantiomerically pure" and "diastereomerically pure" should be understood in a similar way, but then having regard to the enantiomeric excess, and the diastereomeric excess, respectively, of the mixture in question.

Pure stereoisomeric forms of the compounds and intermediates of this invention may be obtained by the application of art-known procedures. For instance, enantiomers may be separated from each other by the selective crystallization of their diastereomeric salts with optically active acids or bases.

Examples thereof are tartaric acid, dibenzoyltartaric acid, ditoluoyltartaric acid and camphorsulfonic acid. Alternatively, enantiomers may be separated by chromatographic techniques using chiral stationary phases. Said pure stereochemically isomeric forms may also be derived from the corresponding pure stereochemically isomeric forms of the appropriate starting materials, provided that the reaction occurs stereospecifically. Preferably, if a specific stereoisomer is desired, said compound is synthesized by stereospecific methods of preparation. These methods will advantageously employ enantiomerically pure starting materials.

The diastereomeric racemates of the compounds of the invention can be obtained separately by conventional methods. Appropriate physical separation methods that may advantageously be employed are, for example, selective crystallization and chromatography, e.g. column chromatography.

In other embodiments of the invention, diastereomeric mixtures are included, i.e. mixtures of compounds having the R- or S-configuration at the phosphorus atom, preferably at ee ratio of at least 80%, preferably at least 90% and more preferably at least 95% S diastereomer at the phosphorous atom.

The present invention also includes isotope-labelled compounds of Formula (I), wherein one or more of the atoms is replaced by an isotope of that atom, i.e. an atom having the same atomic number as, but an atomic mass different from, the one(s) typically found in nature. Examples of isotopes that may be incorporated into the compounds of Formula (I), include but are not limited to isotopes of hydrogen, such as $^2$H and $^3$H (also denoted D for deuterium and T for tritium, respectively), carbon, such as $^{11}$C, $^{13}$C and $^{14}$C, nitrogen, such as $^{13}$N and $^{15}$N, oxygen, such as $^{15}$O, $^{17}$O and $^{18}$O, phosphorus, such as $^{31}$P and $^{32}$p, sulfur, such as $^{35}$S, fluorine, such as $^{18}$F, chlorine, such as $^{36}$Cl, bromine such as $^{75}$Br, $^{76}$Br, $^{77}$Br and $^{82}$Br, and iodine, such as $^{123}$I, $^{124}$I, $^{125}$I and $^{131}$I. The choice of isotope included in an isotope-labelled compound will depend on the specific application of that compound. For example, for drug or substrate tissue distribution assays, compounds wherein a radioactive isotope such as $^3$H or $^{14}$C is incorporated will generally be most useful. For radio-imaging applications, for example positron emission tomography (PET) a positron emitting isotope such as $^{11}$C, $^{18}$F, $^{13}$N or $^{15}$O will be useful. The incorporation of a heavier isotope, such as deuterium, i.e. $^2$H, may provide greater metabolic stability to a compound of Formula (I) which may result in, for example, an increased in vivo half-life of the compound or reduced dosage requirements.

Isotope-labelled compounds of the invention can be prepared by processes analogous to those described in the Schemes and/or Examples herein below by using the appropriate isotope-labelled reagent or starting material instead of the corresponding non-isotope-labelled reagent or starting material, or by conventional techniques known to those skilled in the art.

The pharmaceutically acceptable addition salts comprise the therapeutically active acid and base addition salt forms of the compounds of Formula (I). Of interest are the free, i.e. non-salt forms of the compounds of Formula (I) or any subgroup thereof.

The pharmaceutically acceptable acid addition salts can conveniently be obtained by treating the base form with such appropriate acid. Appropriate acids comprise, for example, inorganic acids such as hydrohalic acids, e.g. hydrochloric or hydrobromic acid, sulfuric, nitric, phosphoric and the like acids; or organic acids such as, for example, acetic, propionic, hydroxyacetic, lactic, pyruvic, oxalic (i.e. ethanedioic), malonic, succinic (i.e. butanedioic acid), maleic, fumaric, malic (i.e. hydroxyl-butanedioic acid), tartaric, citric, methanesulfonic, ethanesulfonic, benzenesulfonic, p-toluenesulfonic, cyclamic, salicylic, p-aminosalicylic, pamoic and the like acids. Conversely said salt forms can be converted by treatment with an appropriate base into the free base form.

The compounds of Formula (I) containing an acidic proton may also be converted into their non-toxic metal or amine addition salt forms by treatment with appropriate organic and inorganic bases. Appropriate base salt forms comprise, for example, the ammonium salts, the alkali and earth alkaline metal salts, e.g. the lithium, sodium, potassium, magnesium, calcium salts and the like, salts with organic bases, e.g. the benzathine, N-methyl-D-glucamine, hydrabamine salts, and salts with amino acids such as, for example, arginine, lysine and the like.

Some of the compounds of Formula (I) may also exist in their tautomeric form. For example, tautomeric forms of amide groups (—C(=O)—NH—) are iminoalcohols (—C(OH)=N—), which can become stabilized in rings with aromatic character. Such forms, although not explicitly indicated in the structural formulae represented herein, are intended to be included within the scope of the present invention.

The terms and expressions used herein throughout the abstract, specification and claims shall be interpreted as defined below unless otherwise indicated. The meaning of each term is independent at each occurrence. These definitions apply regardless of whether a term is used by itself or in combination with other terms, unless otherwise indicated. A term or expression used herein which is not explicitly defined, shall be interpreted as having its ordinary meaning used in the art. Chemical names, common names, and chemical structures may be used interchangeably to describe the same structure. If a chemical compound is referred to using both a chemical structure and a chemical name and an ambiguity exists between the structure and the name, the structure predominates.

DETAILED DESCRIPTION OF EXEMPLARY EMBODIMENTS

Various embodiments of the invention will be described by way of example only with reference to the accompanying Examples, and to FIG. 1 which depicts survival of xenograft transplanted mice administered with a murine-adapted model compound representing the compounds of the invention, in comparison to the corresponding murine-adapted model compound representing the prior art liver-targeted compounds in WO2016/030335.

The compound names were generated by ChemDraw Ultra software, Cambridgesoft, version 12.0.2. In addition to the definitions above, the following abbreviations are used in the synthetic schemes above and the examples below. If an abbreviation used herein is not defined it has its generally accepted meaning.

| | |
|---|---|
| Bn | Benzyl |
| BOP—Cl | Bis(2-oxo-3-oxazolidinyl)phosphinic chloride |
| COMU | (1-Cyano-2-ethoxy-2-oxoethylidenaminooxy)dimethyl-amino-morpholino-carbenium hexafluorophosphate |
| DCC | Dicyclohexylcarbodiimide |
| DCM | Dichloromethane |
| DIEA | Diisopropylethylamine |
| DMAP | 4-Dimethylaminopyridine |
| DMF | N,N-Dimethylformamide |
| DMF-DMA | N,N-Dimethylformamide dimethyl acetal |
| DMPU | N,N'-Dimethylpropyleneurea/1,3-Dimethyltetrahydro-pyrimidin-2(1H)-one |
| EDAC | N-ethyl-N'-[(3-dimethylamino) propyl] carbodiimide |
| EtOAc | Ethyl acetate |
| $Et_3N$ | Triethylamine |
| EtOH | Ethanol |
| $Et_2O$ | Diethyl ether |
| LC | Liquid chromatography |
| HATU | O-(7-Azabenzotrizol-1-yl)-N,N,N',N'-tetramethyluronium hexafluorophosphate |
| HBTU | O-(Benzotriazol-1-yl)-N,N,N',N'-tetramethyluronium hexafluorophosphate |
| HOAc | Acetic acid |
| HOAt | 1-Hydroxy-7-azabenzotriazole |
| HOBt | 1-Hydroxybenzotriazole |
| HPLC | High performance liquid chromatography |
| MeCN | Acetonitrile |
| MeOH | Methanol |
| on | Over night |
| Pg | Protecting group |
| Ph | Phenyl |
| PyBOP | (Benzotriazol-1-yloxy) tris-(dimethylamino) phosphonium hexafluorophosphate |
| rt | Room temperature |
| THF | Tetrahydrofuran |
| TFA | Trifluoroacetic acid |
| TFAA | Trifluoroacetic anhydride |
| TIPS | Triisopropylsilyl |

Nucleoside: Preparation of 5-F-Tr-der

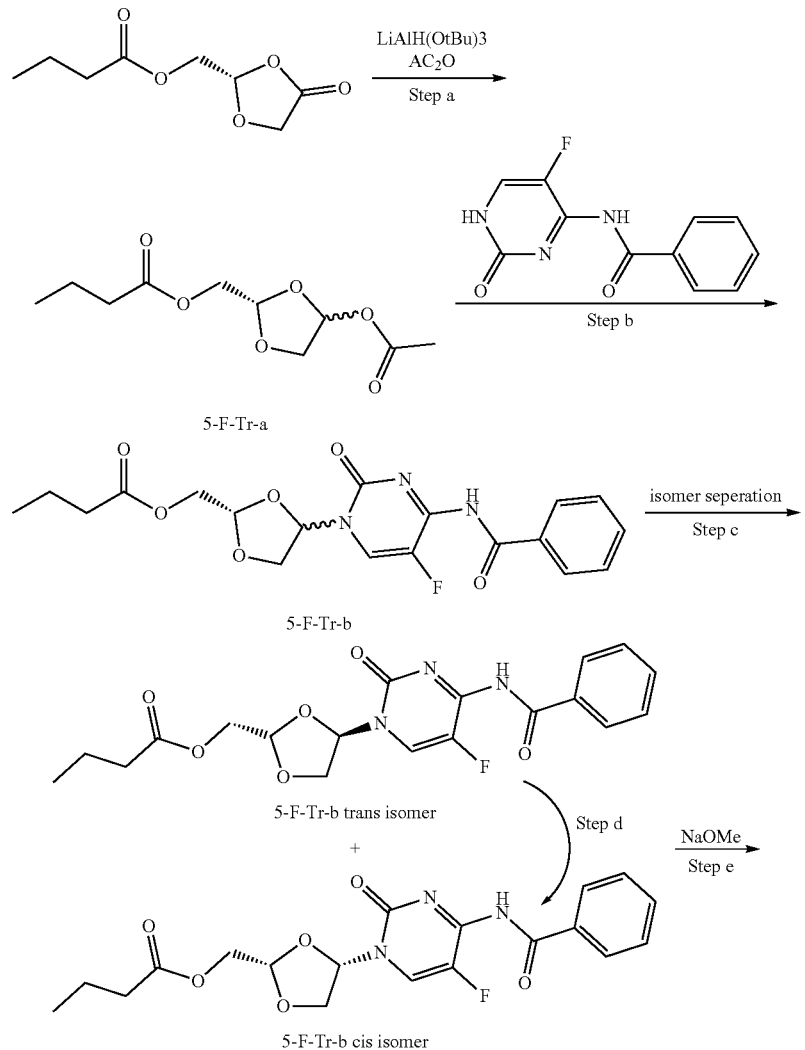

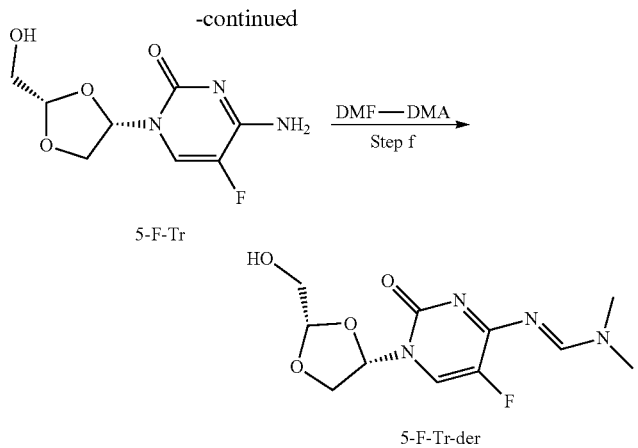

5-F-Tr-der

Step a) (S)-(4-acetoxy-1,3-dioxolan-2-yl)methyl butyrate (5-F-Tr-a)

To a stirred solution of LiAlH(OtBu)3 (1M in THF) (1.23 L, 1230 mmol) was added a solution of compound (S)-(4-oxo-1,3-dioxolan-2-yl)methyl butyrate[1] (163 g, 866.2 mmol) in THF (500 mL) dropwise over a period of 90 min at −20° C. (an increase of 4° C. in internal temperature was observed) and stirred at −20° C. for 90 min. Triethylamine (425 mL, 3029.7 mmol) was added to the above reaction mixture dropwise at −20° C. (an increase of 4° C. in internal temperature was observed) over a period of 60 min and stirred at −20° C. for 15 min. The reaction mixture was then quenched with a solution of water (90 mL, 4995.8 mmol) in THF (500 mL) which was added dropwise over a period of 90 min, then a solution of DMAP (53 g, 433.83 mmol) in THF (500 mL) was added dropwise at −25° C. over a period of 30 min followed by addition of acetic anhydride (520 mL, 5501.1 mmol) dropwise at −25° C. over a period of 2 h. The reaction mixture was stirred at rt for 16 h, then concentrated, 30% potassium sodium tartrate solution (6 L) was added to the residue and extracted with ethyl acetate (2×1.5 L), washed with brine (2×1.5 L). The combined organic layers were dried over sodium sulphate, concentrated under reduced pressure. The crude was purified by fractional distillation at 122-136° C. (0.01 mm of Hg vacuum) to obtain the title compound (142 g) as colourless oil.

$^1$H NMR (500 MHZ, CDCl$_3$): δ6.39 (m, 1 H) 5.36 (m, 1 H) 4.27-4.20 (m, 3 H) 3.99 (m, 1 H) 2.31 (m, 2 H) 2.08 (s, 3 H) 1.68 (m, 2 H) 0.95 (m, 3 H).

Step b) (S)-(4-(4-benzamido-5-fluoro-2-oxopyrimidin-1(2H)-yl)-1,3-dioxolan-2-yl)methyl butyrate (5-F-Tr-b)

To a stirred suspension of N-(5-fluoro-2-oxo-1,2-dihydropyrimidin-4-yl)benzamide (48 g, 412.07 mmol) in chlorobenzene (250 mL) was added 1,1,1,3,3,3-Hexamethyldisilazane (87 mL, 286.26 mmol) and ammonium sulphate (1 g, 7.56 mmol) then heated to 140° C. for 60 min. The reaction mixture was evaporated to dryness under reduced pressure, the residue was taken in DCM (150 mL) and a solution of compound 5-F-Tr-a (39 g, 151.14 mmol) in DCM (250 mL) was added at 0° C., followed by the dropwise addition of iodotrimethylsilane (23 mL, 161.61 mmol) the reaction mixture was stirred for 16 h at rt. 0.2N HCl (100 mL) was added and filtered through the Celite bed, the filtrate was extracted with DCM (2×500 mL) and washed with saturated sodium thio sulphate solution (2×150 mL), water (2×150 mL) and brine (1×150 mL). The combined organic layers were dried over sodium sulphate, filtered and concentrated under reduced pressure. The afforded crude compound was purified by column chromatography on silica gel and eluted with 40-50% ethyl acetate in hexane, which gave the title compound (35 g, 51%) as a solid. MS (ES+) 287.1 [M+H]$^+$.

Step c) and d) (4-benzamido-1-((2S,4S)-2-(butyryloxymethyl)-1,3-dioxolan-4-yl)-5-fluoropyrimidin-2(1H)-ylidene)oxonium (5-F-Tr-b cis isomer)

The crude compound 5-F-Tr-b (70 g) was purified by column chromatography on silica gel and eluted with 25% ethyl acetate in pet ether, fractions were evaporated under reduced pressure to obtain 5-F-Tr-b trans isomer (25 g, 36%) as an off white solid. Again eluted with 40% ethyl acetate in pet ether, fractions were evaporated under reduced pressure which was triturated with diethyl ether to obtain the title compound 5-F-Tr-b cis isomer (30 g, 43%) as white solid.

Step d)

To a stirred suspension of N-(5-fluoro-2-oxo-1,2-dihydropyrimidin-4-yl)benzamide (16 g, 68.61 mmol) in chlorobenzene (150 mL) was added 1,1,1,3,3,3-Hexamethyldisilazane (35 mL, 167 mmol) and ammonium sulphate (420 mg, 3.178 mmol) then heated to 140° C. for 60 min. The reaction mixture was completely evaporated to dryness under reduced pressure, the residue was taken in toluene (300 mL).

In a separate flask, a solution of compound 5-F-Tr-b trans isomer (25 g, 61.05 mmol) in toluene (200 mL) was cooled to 0° C. and iodotrimethylsilane (15 mL, 104.95 mmol) was added dropwise and the reaction mixture was stirred for 30 min at 0° C., then the above suspension was added dropwise over a period of 30 min. The reaction mixture was stirred at rt for 16 h. 0.2N HCl (100 mL) was added and filtered through the Celite bed, the filtrate was extracted with DCM (2×350 mL) and washed with saturated sodium thio sulphate solution (2×150 mL), water (2×150 mL) and brine (1×150 mL). The combined organic layers were dried over sodium sulphate, filtered and concentrated under reduced pressure. The afforded crude compound was purified by column chromatography on silica gel and eluted with 40-50% ethyl acetate in hexane, which gave the title compound cis isomer (9 g, 36%) as a solid.

¹H NMR (400 MHZ, DMSO): δ11.81 (d, J=343.8 Hz, 1H), 8.27 (s, 1H), 7.99 (d, J=7.4 Hz, 2H), 7.54 (d, J=6.7 Hz, 3H), 6.22 (s, 1H), 5.24 (s, 1H), 4.37 (m, J=7.5 Hz, 3H), 4.19 (s, 1H), 2.30 (s, 2H), 1.53 (q, J=6.9 Hz, 2H), 0.85 (s, 3H).

Step e) 4-amino-5-fluoro-1-((2S,4S)-2-(hydroxymethyl)-1,3-dioxolan-4-yl)pyrimidin-2(1H)-one (5-F-Tr)

To a stirred solution of compound 5-F-Tr-b cis isomer (20 g, 49.34 mmol) in methanol (160 mL) and ethanol (160 mL) was added 1M NaOMe in methanol (16 mL, 16 mmol) at room temperature, the reaction mixture stirred for 48 h at rt, then acidified with isobutyric acid (5 g).

The insoluble were filtered and the filtrate was concentrated to dryness. The crude compound was dissolved in hot isopropanol (135 mL) and seeding amount (10 mg) of previously isolated title compound was added and allowed to rt for 2 h. The obtained crystals were filtered and washed with isopropanol (2×50 mL) and dried which gave the title compound (9.3 g, 81.5%) as white solid.

¹H NMR (500 MHZ, DMSO-d6): δ 8.17 (d, J=7.32 Hz, 1H), 7.71-7.82 (m, 1H), 7.47-7.58 (m, 1H), 6.09-6.16 (m, 1H), 5.27-5.34 (m, 1H), 4.89-4.94 (m, 1H), 4.11-4.16 (m, 1H), 4.04-4.11 (m, 1H), 3.66-3.71 (m, 2H).

Step f) (E)-N'-(5-fluoro-1-((2S,4S)-2-(hydroxymethyl)-1,3-dioxolan-4-yl)-2-oxo-1,2-dihydropyrimidin-4-yl)-N,N-dimethylformimidamide To a stirred solution of compound 5-F-Tr (300 mg, 1.29 mmol) in methanol (3 mL) was added N,N-Dimethylformamide dimethyl acetal (0.9 mL, 6.72 mmol) and stirred at 60° C. for 3 h, then concentrated under reduced pressure. The obtained crude was washed with pentane, decanted and dried under high vacuum which gave the title compound (350 mg, 89%) as a solid. MS (ES+) 287.1 [M+H]⁺.

Intermediate 1

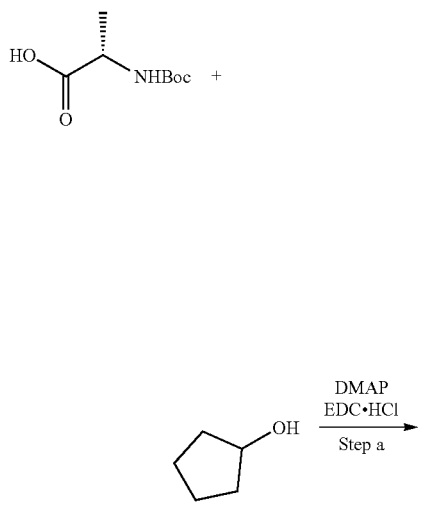

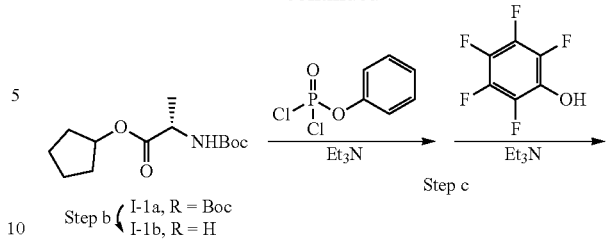

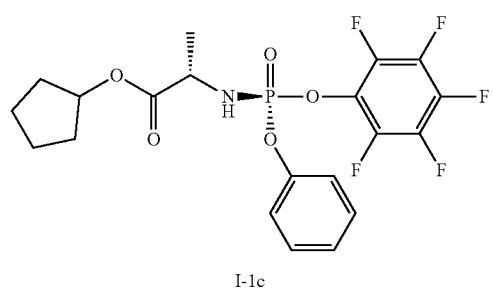

Step a) (S)-cyclopentyl 2-(tert-butoxycarbonylamino)propanoate (I-1a)

L-Boc-alanine (4.0 g, 21.14 mmol) was dissolved in dry DCM (60 mL) and cyclopentanol (2.2 mL, 24.01 mmol) was added. The mixture was cooled to 5° C. and EDC HCl (4.5 g, 23.47 mmol) was added in one portion followed by addition of DMAP (258 mg, 2.114 mmol). The mixture was stirred at rt for 16 h, then diluted with water and the aqueous layer was extracted with ethyl acetate (2×200 mL). The combined organic layers were washed with sodium bicarbonate solution (50 mL), brine (50 mL), dried with anhydrous Na₂SO₄, filtered and concentrated under reduced pressure. The afforded crude compound was purified by column chromatography on SiO₂ eluted with 20% EtOAc in hexane, which gave the title compound (5 g, 91%) as a solid.

¹H NMR (500 MHZ, DMSO): δ 7.22 (d, J=7.1 Hz, 1H), 5.06 (t, J=5.8 Hz, 1H), 3.90 (t, J=7.3 Hz, 1H), 1.80 (t, J=6.3 Hz, 2H), 1.58 (m, J=6.3 Hz, 6H), 1.38 (s, 9H), 1.19 (t, J=6.4 Hz, 3H).

Step b) (S)-1-(cyclopentyloxy)-1-oxopropan-2-aminium chloride (I-1b)

To a stirred solution of compound I-1a (5 g, 19.43 mmol) in dry 1,4-dioxane (20 mL) was added 4M HCl in 1,4-dioxane (30 mL, 120 mmol) and the mixture was stirred at 22° C. for 30 min, then concentrated under reduced pressure which gave the title compound (3.7 g, 98%) as a solid.

¹H NMR (500 MHZ, DMSO): δ 8.43 (s, 3H), 5.18 (m, J=2.9 Hz, 1H), 4.01 (q, J=7.2 Hz, 1H), 1.86 (m, J=3.5 Hz, 2H), 1.62 (m, J=4.4 Hz, 6H), 1.38 (d, J=7.2 Hz, 3H).

Step c) (S)-cyclopentyl 2-((S)-(perfluorophenoxy)(phenoxy)phosphorylamino)propanoate(1-1c)

To a stirred solution of compound I-1b (3.7 g, 18.93 mmol) in dry DCM (30 mL), triethylamine (6.5 mL, 46.76 mmol) was added dropwise at −70° C. over 30 min, followed by addition of a solution of phenyl dichlorophosphate (4 g, 18.96 mmol) in dry DCM (30 mL) over 21 min. The reaction mixture was stirred at −70° C. for additional 30 min and then allowed to warm to 0° C. over 2 h and stirred at 0° C. for 1 h. To this mixture was added a solution of pentafluorophenol (3.1 g, 17.00 mmol) and triethylamine (3 mL, 21.58 mmol) in dry DCM (10 mL) over 1 h. The mixture was allowed to stir at 0° C. for 4 h. The reaction was filtered and filtrate was concentrated under reduced pressure. The afforded crude compound was purified by column chromatography on silica gel and eluted with 12% EtOAc in hexane. The (S)-isomer[2] was isolated by recrystallization with 10% EtOAc in hexane, which gave the title compound (1.5 g, 14%) as a solid. MS m/z 480.13 [M+H]$^+$.

$^1$H NMR (500 MHZ, DMSO): δ 1.27 (d, J=7.34 Hz, 3H), 1.49-1.65 (m, 6H), 1.72-1.86 (m, 2H), 3.92 (m, J=10.33, 7.13 Hz, 1H), 4.99-5.08 (m, 1H), 6.86 (dd, J=14.18, 9.78 Hz, 1H), 7.16-7.31 (m, 3H), 7.39-7.47 (m, 2H)

$^{31}$P NMR (500 MHZ, DMSO): δ 0.300.

Intermediate 2

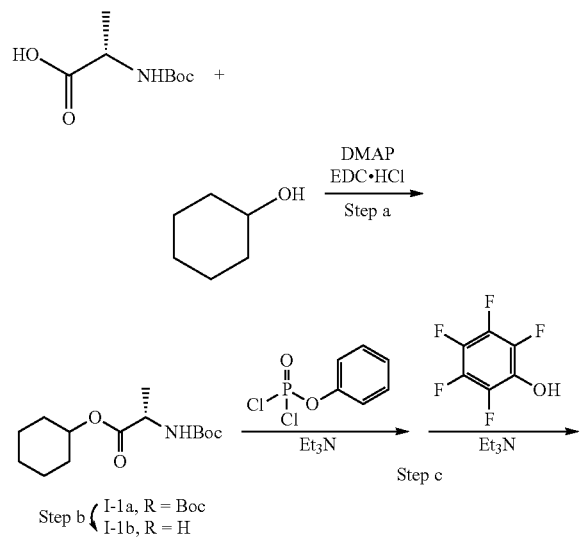

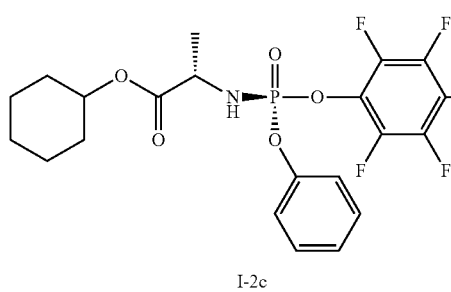

I-2c

Step a) (S)-cyclohexyl 2-(tert-butoxycarbonylamino)propanoate (1-2a)

L-Boc-alanine (5.7 g, 30.0 mmol) was dissolved in dry DCM (75 mL) and cyclohexanol (2.6 mL, 25.0 mmol) was added. The mixture was cooled to 0° C. and EDC HCl (5.25 g, 27.5 mmol) was added in one portion followed by addition of DMAP (460 mg, 3.74 mmol). The mixture was stirred at rt for 16 h, then diluted with water and the aqueous layer was extracted with ethyl acetate (2×200 mL). The combined organic layers were washed with sodium bicarbonate solution (50 mL), brine (50 mL), dried with anhydrous $Na_2SO_4$, filtered and concentrated under reduced pressure. The crude compound was purified by column chromatography on silica gel and eluted with 10% EtOAc in hexane, which gave the title compound (5.5 g, 63%) as a solid. MS (ES+) 572.26 [M+H]$^+$.

$^1$H NMR (500 MHZ, $CDCl_3$): 5.06 (m, 1 H) 4.81 (m, 1 H) 4.27 (m, 1 H) 1.84 (m, 2 H) 1.72 (m, 2 H) 1.53 (m, 1 H) 1.44 (m, 11 H) 1.34 (m, 5 H) 1.25 (m, 1 H).

Step b) (S)-cyclohexyl 2-aminopropanoate (1-2b)

To a stirred solution of compound I-2a (5.5 g, 20.27 mmol) in dry 1,4-dioxane (60 mL) was added 4M HCl in 1,4-dioxane (31 mL, 122.0 mmol) and the mixture was stirred at 22° C. for 2 h, then concentrated under reduced pressure which gave the title compound (4.5 g) as a solid which was taken to the next step without further purification.

$^1$H NMR (500 MHZ, DMSO): δ 8.62 (s, 3H), 4.79 (m, J=4.2 Hz, 1H), 4.01 (q, J=7.1 Hz, 1H), 1.78 (s, 2H), 1.68 (d, J=2.4 Hz, 2H), 1.41 (m, J=8.2 Hz, 9H).

Step c) (S)-cyclohexyl 2-((S)-(perfluorophenoxy)(phenoxy)phosphorylamino)propanoate To a stirred solution of compound I-2b (4.5 g, 22.0 mmol) in dry DCM (125 mL), triethylamine (6.4 mL, 45.0 mmol) was added dropwise at −78° C. over 30 min, followed by addition of a solution of phenyl dichlorophosphate (4.6 g, 22.00 mmol) in dry DCM (75 mL) over 30 min. The reaction mixture was stirred at −78° C. for additional 30 min and then allowed to warm to 0° C. over 2 h and stirred at 0° C. for 1 h. To this mixture was added a solution of pentafluorophenol (3.6 g, 19.00 mmol) and triethylamine (3.3 mL, 24 mmol) in dry DCM (50 mL) over 15 min. The mixture was allowed to stir at rt for 5 h. The reaction was filtered and filtrate was concentrated under reduced pressure. The afforded crude compound was purified by column chromatography on silica gel and eluted with 12%

EtOAc in hexane. The (S)-isomer[2] was isolated by recrystallization with 10% EtOAc in hexane, which gave the title compound (2.4 g, 20%) as a solid. MS m/z 494.18 [M+H]$^+$.

$^1$H NMR (500 MHZ, CDCl3): δ 7.37 (m, 2 H) 7.30 (br d, J=8.07 Hz, 1 H) 7.23 (m, 2 H) 4.81 (m, 1 H) 4.15 (m, 1 H) 3.95 (m, 1 H) 1.76 (m, 4 H) 1.63 (m, 1 H) 1.37 (m, 10 H).

$^{31}$P NMR (500 MHZ, CDCl3): δ-1.587

Example 1

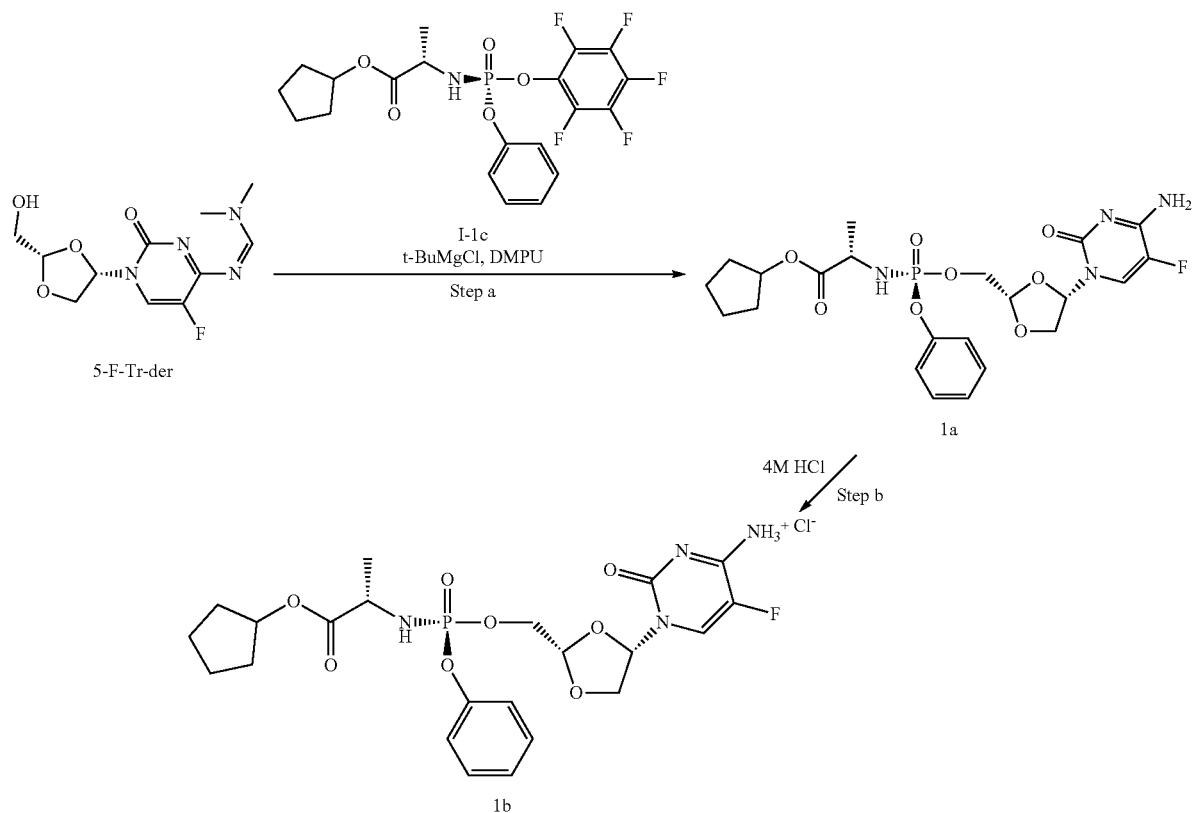

Step a) (S)-cyclopentyl 2-((S)-(((2S,4S)-4-(4-amino-5-fluoro-2-oxopyrimidin-1(2H)-yl)-1,3-dioxolan-2-yl) methoxy)(phenoxy)phosphorylamino)propanoate (1a)

To a stirred solution of compound 5-F-Tr-der (350 mg, 1.23 mmol) in dry THF (20 mL), DMPU (1.4 mL, 11.62 mmol) and tert-butylmagnesium chloride (1.4 mL, 1.40 mmol, 1M in THF) were added dropwise at rt. The mixture was stirred at rt for 30 min. A solution of compound I-1c (703 mg, 1.46 mmol) in dry THF (10 mL) was added at rt and the reaction mixture was stirred at rt for 16 h. The reaction mixture was quenched with 1N HCl solution (2.5 mL) and extracted with ethyl acetate (2×20 mL). The combined organic layers were washed with saturated sodium bicarbonate solution (20 mL), brine (20 mL), dried over anhydrous $Na_2SO_4$, filtered and concentrated under reduced pressure. Crude compound was purified by reverse phase C18 column chromatography eluted with acetonitrile/0.1% formic acid in water followed by Chiral SFC, which gave the title compound (420 mg, 65%) as an off-white solid. MS (ES+) 527.29 [M+H]$^+$.

Preparative SFC Conditions

Column/dimensions: Chiralcel OX-H (30×250 mm), 5µ
% $CO_2$: 70.0%
% Co solvent: 30.0% (100% Isopropanol)
Total flow: 100.0 g/min
Back pressure: 100.0 bar
UV: 214 nm
Stack time: 4.1 min
Load/Inj.: 11.75 mg Step b)1-((2S,4S)-2-(((S)-((S)-1-(cyclopentyloxy)-1-oxopropan-2-ylamino)(phenoxy)phosphoryloxy) methyl)-1,3-dioxolan-4-yl)-5-fluoro-2-oxo-1,2-dihydropyrimidin-4-aminium chloride (1b)

To a stirred solution of compound 1a (420 mg, 0.77 mmol) in dry 1,4-dioxane (6 mL) was added 4M HCl in 1,4-dioxane (0.4 mL, 1.6 mmol) at 0° C. and the mixture was stirred at 22° C. for 30 min then concentrated. The obtained crude was washed with tert-butyl methyl ether, decanted and dried under high vacuum which gave the title compound (290 mg, 67%) as a solid. MS (ES+) 527.27 [M+H]$^+$.

$^{31}$P NMR (500 MHZ, DMSO): δ 3.781

$^{19}$F NMR (500 MHz, DMSO, coupled): δ-166.64 (d, 1F)

$^{19}$F NMR (500 MHZ, DMSO, decoupled): δ-166.64 (s, 1F)

$^1$H NMR (500 MHZ, DMSO): δ8.20 (s, 2H), 7.88 (d, J=6.7 Hz, 1H), 7.36 (t, J=7.9 Hz, 2H), 7.18 (q, J=7.4 Hz, 3H), 6.19 (d, J=5.4 Hz, 1H), 6.10 (q, J=7.9 Hz, 1H), 5.16 (s, 1H), 5.03 (t, J=5.9 Hz, 1H), 4.28 (q, J=5.4 Hz, 1H), 4.20 (t, J=8.9 Hz, 2H), 4.14 (q, J=5.2 Hz, 1H), 3.73(m, J=5.5 Hz, 1H), 1.77 (q, J=6.5 Hz, 2H), 1.56 (m, J=7.7 Hz, 6H), 1.18 (d, J=7.1 Hz, 3H).

Example 2

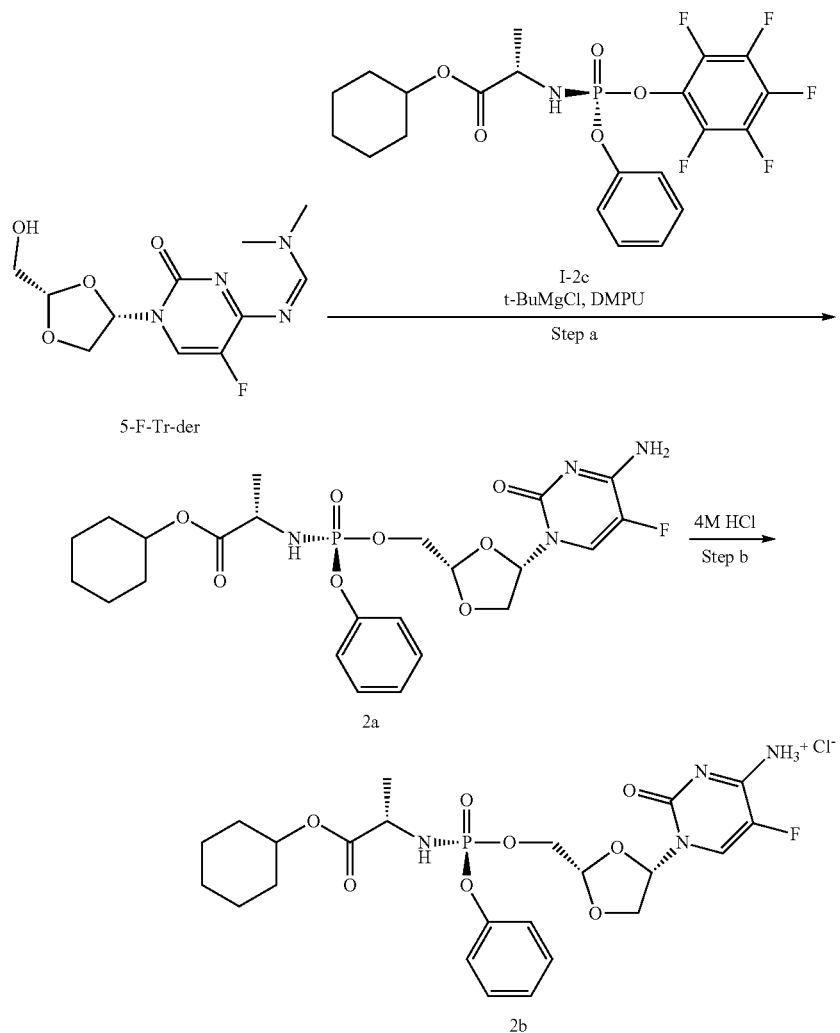

Step a) (S)-cyclohexyl 2-((S)-(((2S,4S)-4-(4-amino-5-fluoro-2-oxopyrimidin-1(2H)-yl)-1,3-dioxolan-2-yl)methoxy)(phenoxy)phosphorylamino)propanoate (2a)

To a stirred solution of compound 5-F-Tr-der (350 mg, 1.22 mmol) in dry THF (15 mL), DMPU (1.4 mL, 11.44 mmol) and tert-butylmagnesium chloride (1.35 mL, 1.35 mmol, 1M in THF) were added dropwise at −5° C. The mixture was stirred at −5° C. for 30 min, then at rt for 30 min. A solution of compound I-2c (724 mg, 1.46 mmol) in dry THF (15 mL) was added at −5° C. and the reaction mixture was stirred at rt for 16 h. The reaction mixture was quenched with 1N HCl solution (2.5 mL) and extracted with ethyl acetate (2×20 mL). The combined organic layers were washed with saturated sodium bicarbonate solution (20 mL), brine (20 mL), dried over anhydrous $Na_2SO_4$, filtered and concentrated under reduced pressure. Crude compound was purified by reverse phase C18 column chromatography eluted with acetonitrile/0.1% formic acid in water followed by Chiral SFC, which gave the title compound (320 mg, 48%) as an off-white solid. MS (ES+) 541.24 $[M+H]^+$.

Preparative SFC Conditions

Column/dimensions: Chiralcel OX-H (30×250 mm), 5 μm
% $CO_2$: 65.0%
% Co solvent: 35.0% (100% isopropanol)
Total Flow: 100.0 g/min
Back Pressure: 90.0 bar
UV: 214 nm
Stack time: 6.5 min
Load/Inj: 15.0 mg

Step b) 1-((2S,4S)-2-(((((S)-(((S)-1-(cyclohexyloxy)-1-oxopropan-2-yl)amino)(phenoxy)phosphoryl)oxy)methyl)-1,3-dioxolan-4-yl)-5-fluoro-2-oxo-1,2-dihydropyrimidin-4-aminium chloride(2b)

To a stirred solution of compound 2a (320 mg, 0.57 mmol) in dry 1,4-dioxane (6 mL) was added 4M HCl in 1,4-dioxane (0.3 mL, 1.13 mmol) at 0° C. and the mixture was stirred at 22° C. for 30 min then concentrated. The obtained crude was washed with tert-butyl methyl ether, decanted and dried under high vacuum which gave the title compound (280 mg, 85%) as a solid.MS (ES+) 541.32 [M+H]$^+$.

$^{31}$P NMR (500 MHZ, DMSO): δ3.753

$^{19}$F NMR (500 MHZ, DMSO, coupled): δ-166.64 (d, 1F)

$^{19}$F NMR (500 MHZ, DMSO, decoupled): δ-166.65 (d, 1F)

$^1$H NMR (500 MHZ, DMSO): δ8.28 (d, J=24.3 Hz, 2H), 7.89 (d, J=6.7 Hz, 1H), 7.36 (t, J=7.8 Hz, 2H), 7.18 (q, J=8.2 Hz, 3H), 6.18 (d, J=5.4 Hz, 1H), 6.12 (q, J=7.9 Hz, 1H), 5.16 (s, 1H), 4.63 (t, J=4.0 Hz, 1H), 4.28 (q, J=5.5 Hz, 1H), 4.20 (t, J=8.8 Hz, 2H), 4.15 (q, J=5.2 Hz, 1H), 3.76 (q, J=9.1 Hz, 1H), 1.70 (s, 2H), 1.62 (d, J=5.4 Hz, 2H), 1.46 (t, J=5.8 Hz, 1H), 1.31 (m, J=8.8 Hz, 4H), 1.21 (d, J=7.1 Hz, 4H).

REFERENCE

[1]WO2005074654.
[2]J. Org. Chem., 2011, 76 (20), pp 8311-8319.

Biology Example 1

Compounds of the invention were evaluated for activity against various leukemia cell lines using the following assay to:

Materials

Cells and Cell Culture

THP-1 cells (human acute monocytic leukemia) from ATCC Cat. no TIB-202 were grown in complete cell medium: RPMI-1640 medium Gibco Cat. no.11835-063 (Fisher Scientific), 10% Fetal Bovine serum (FBS), HyClone Cat. no. SV30160.03, lot no RAB35924 (GE Healthcare Life Sciences), Penicillin 50 u/ml/Streptomycin 0.05 mg/ml PAA Cat. no. P11-010 from Fisher Scientific.

MV4-11 cells (human B-myelomonocytic leukemia) from ATCC Cat no. CRL-9591 were grown in complete cell medium: IMDM (w. GLUTAMAX-1) Cat no. 31980022 (Fisher Scientific), 10% Fetal Bovine serum (FBS) HyClone Cat. no. SV30160.03, lot no RAB35924 (GE Healthcare Life Sciences), Penicillin 50 u/ml/Streptomycin 0.05 mg/ml PAA Cat. no. P11-010 from Fisher Scientific.

HL60 cells (human acute promyelocytic leukemia) from ATCC Cat. no CCL-240 were grown in complete cell medium: IMDM Cat. no 330-2005 (ATCC), 20% Fetal Bovine serum (FBS) HyClone Cat. no. SV30160.03, lot no RAB35924 (GE Healthcare Life Sciences), Penicillin 50u/ml/Streptomycin 0.05 mg/ml PAA Cat. no. P11-010 from Fisher Scientific U-937 cells (human histiocytic lymphoma) from ATCC Cat. no CRL-1593.2 were grown in complete cell medium: RPMI-1640 medium Gibco Cat. no.11835-063 (Fisher Scientific), 10% Fetal Bovine serum (FBS), HyClone Cat. no. SV30160.03, lot no RAB35924 (GE Healthcare Life Sciences), Penicillin 50u/ml/Streptomycin 0.05 mg/ml PAA Cat. no. P11-010 from Fisher Scientific.

K-562 cells (human chronic myelogenous leukemia) from ATCC Cat. no CCL-243 were grown in complete cell medium: IMDM (w. L-glutamine, 25 mM Hepes, w/o Phenol red) Cat no. 21056-023 (Fisher Scientific), 10% Fetal Bovine serum (FBS) HyClone Cat. no. SV30160.03, lot no RAB35924 (GE Healthcare Life Sciences), Penicillin 50u/ml/Streptomycin 0.05 mg/ml Cat. no. SV30010 HyClone (Fisher Scientific)

MOLT-4 cells (human T-cell, acute lymphoblastic leukemia) from ATCC Cat. no CRL-1582 were grown in complete cell medium: RPMI-1640 medium Gibco Cat. no.11835-063 (Fisher Scientific), 10% Fetal Bovine serum (FBS) HyClone Cat. no. SV30160.03, lot no RAB35924 (GE Healthcare Life Sciences), Penicillin 50 u/ml/Streptomycin 0.05 mg/ml PAA Cat. no. P11-010 from Fisher Scientific Raji cells (B-lymphocyte from Burkitt's lymphoma) from ATCC Cat. no CCL-86 were grown in complete cell medium: RPMI-1640 medium Gibco Cat. no.11835-063 (Fisher Scientific), 10% Fetal Bovine serum (FBS), HyClone Cat. no. SV30160.03, lot no RAB35924 (GE Healthcare Life Sciences), Penicillin 50 u/ml/Streptomycin 0.05 mg/ml PAA Cat. no. P11-010 from Fisher Scientific.

CEM cells (T-lymphoblast from acute lymphoblastic leukemia) acquired from Swedish Institute for Infectious Disease Control (SMI) were grown in complete cell medium: RPMI-1640 medium (without L-glutamine) Cat. no. R7509 (Sigma Aldrich), 10% Fetal Bovine serum (FBS) HyClone Cat. no. SV30160.03, lot no RAB35924 (GE Healthcare Life Sciences), Penicillin 50u/ml/Streptomycin 0.05 mg/ml PAA Cat. no. P11-010 from Fisher Scientific, 2 mM Ultra glutamine 1 Cat. no BE17-605E/U1 (Lonza).

Cell culture flask 75 cm2, Cat. no. 83.1813 from Sarstedt AB.

Compound dilution plate, 96-well, V-bottom PP plate, Nunc Cat. no.249944 from Thermo Scientific.

Cell assay plate, 96-well, Cat. no. 128009296 from Fisher Scientific

Cell Counting Kit-8 CK04 from Dojindo.

Test compounds were made up to 10 mM stock solution in DMSO

Method

Leukemia cells were grown in a cell culture flask 75 cm2 with approximately 100 ml complete cell medium. The cells were counted using a Scepter-hand held automated cell counter, using 60 μm sensors (Millipore) and suspended in complete cell medium to 2×10$^5$cells. 100 μl of the cell suspension were seeded to all wells (2×10$^4$ cells/well).

Test Compound Dilutions:

The compounds were tested in twelve concentrations, 10-fold serial dilutions, 50 ▯ BM–5×10$^{-10}$ μM. 100 μl from a compound dilution plate were transferred to the cell assay plate=200 μl/well total volume and incubated for 5 days, at 37° C., 5% CO$_2$ incubator.

After 5 days, 10 μl of KIT-8 was added and the culture was incubated for 3-4 hours, at 37° C., 5% CO$_2$ incubator.

Plate were read in the spectrophotometer at wavelength 450 nm with a reference filter of 620 nm.

Data Analysis

CC$_{50}$ values are calculated by plotting the degree of inhibition (compared to the vehicle ctrl) against the logarithm of the compound concentration. Result values in the dilution series are fitted to a 4-parameter sigmoidal dose-response curve described by the expression:

$$F(x) = D + (A - D)/(1 + (x/C)^\wedge B)$$

where:
A=Minimum
B=Slope.

C=Inflection point. The inflection point is defined as the point on the curve where the curvature changes direction or signs.
D=Maximum
F=fraction inhibition The $CC_{50}$ value is the x-value giving F=0.5, as tabulated in Table 1 below:

The compounds of the invention were compared to the most structurally similar compounds in the above described liver-targeted, hepatocellular carcinoma patent application WO2016/030335, in particular Examples 29 dia-2 and 32 dia-2:

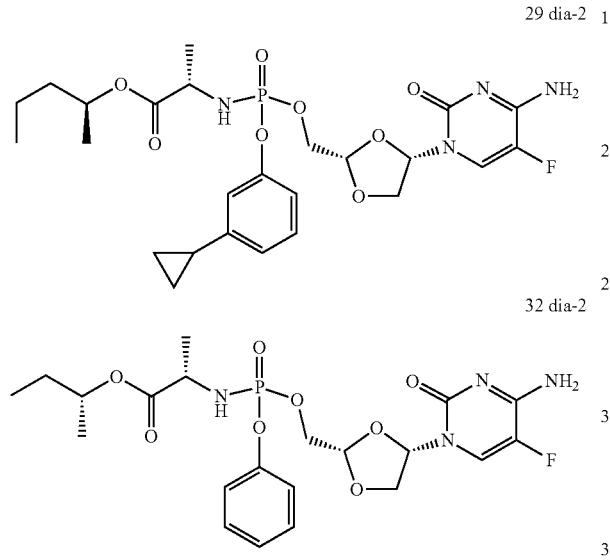

29 dia-2

32 dia-2

TABLE 1

| Leukemia type | Cell line | Example 1 µM | Example 2 µM | Prior art Ex 29 dia-2 µM | Prior art Ex 32 dia 2 µM |
|---|---|---|---|---|---|
| AML | MV411 | 0.0052 | 0.063 | 0.0078 | 0.0081 |
| AML | THP1 | 0.12 | 0.090 | 0.25 | 0.20 |
| AML | HL60 | 0.12 | 0.18 | nd | 0.89 |
| AML | U937 | 0.15 | 0.14 | 0.24 | 0.24 |
| CML | K562 | 0.30 | 0.20 | 0.72 | 0.44 |
| ALL (T cell) | MOLT-4 | 0.0020 | 0.000062 | 0.0029 | 0.0038 |
| BL (B cell) | RAJI | 0.25 | 0.18 | 0.85 | 1.0 |
| ALL (T cell) | CEM | 0.040 | 0.030 | 0.098 | 0.052 |
| Average $CC_{50}$ | | 0.12 | 0.10 | 0.31 | 0.35 |
| Normal blood | PBMC (3 day) | nd | >100 | nd | nd |

It will be apparent that the compounds of the invention are highly potent in a range of leukemia cell lines, and far surpass the potency of the compounds of the prior art on average and in a majority of lines.

Biology Example 2

Blood Stability

Stability of compounds in blood was assessed following incubation in murine or human whole blood for up to 120 minutes. Remaining compound was quantified by LC-MS/MS and resulting data were used to calculate intrinsic clearance (CLint) values:

| Compound | CLint (uL/min/mL) human blood | CLint (uL/min/mL) mouse blood |
|---|---|---|
| Example 1 | 2 | >150 |
| Example 2 | <2 | >150 |

It will be apparent that the compounds of the invention are very stable in human blood, but are extremely rapidly metabolized in murine blood.

Biology Example 3

Tolerability

From Biology Example 2, it is apparent that the compounds of the invention lack stability in mouse blood, which renders conventional in vivo assays of tolerability and efficacy on xenografts impossible to implement. The compounds are quite simply broken down within minutes of administration However, the promise of the compounds of the invention could be implied from a murine xenograft TGI model using the underlying parent nucleoside 5-fluorotroxacitabine (which is stable in mouse blood) as a proxy. Compounds were prepared in PBS, n=9 mice per group. Body weights were monitored daily in three SCID mouse populations:

| | |
|---|---|
| G1 | Vehicle control i.p. BID × 5 |
| G2 | Troxacitabine parent 25 mg/kg i.p. BID × 5 (comparative example) |
| G-3 | 5-fluorotroxacitabine parent 108 mg/kg i.p. BID × 5 (invention) | wherein the 5 day BID commenced 21 days after subcutaneous implantation with a human Hep3b xenograft. The results, as bodyweight (% of pre-dose weight) vs days are plotted below.

The vehicle group was followed until study day 38/41 whereupon the tumour volume (TV) was at a terminal size (mean diameter 15 mm, TV~1500 mm³. The troxacitabine group were all terminated day 28-29 after implantation due to persistent bodyweight loss and clinical signs including piloerection, hunched posture and subdued behavior. In contrast the 5-fluorotroxacitabine group was followed until tumour volume reached a terminal size on day 59, at which point the mice were substantially at their pre-dose weights. As mentioned in the Background to the Invention above, troxacitabine went into clinical trials in various indications but failed to be registered as a drug, broadly speaking due to an inadequate safety profile. The results for troxacitabine in this TGI experiment are consistent with that clinical experience. The surprise of the study, however, was the enhanced tolerability of the 5-fluorotroxacitabine group which indirectly supports that the compounds of the invention are well tolerated and thus uncommonly well suited to administration to the notoriously fragile AML population ≥60.

The invention claimed is:
1. A compound of the formula I

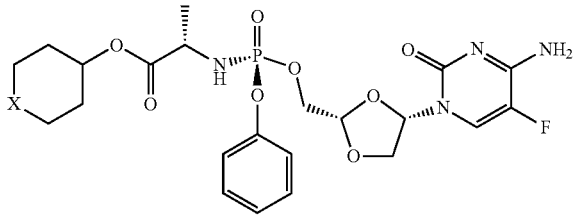

wherein X is a bond or —CH$_2$-
or a pharmaceutically acceptable salt thereof.

2. A compound, or pharmaceutically acceptable salt thereof, according to claim 1 with the formula IA:

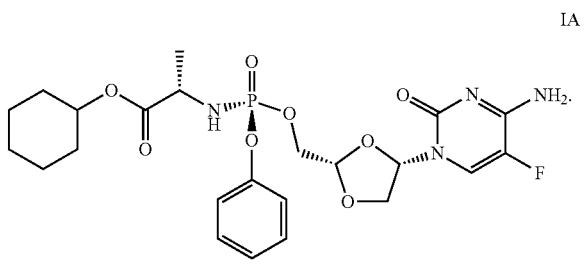 [SMILES: C[C@H](N[P@](=O)(OC[C@H]1OC[C@@H](n2cc(F)c(N)nc2=O)O1)Oc1ccccc1)C(=O)OC1CCCCC1]

3. A compound, or pharmaceutically acceptable salt thereof, according to claim 1 with the formula IB:

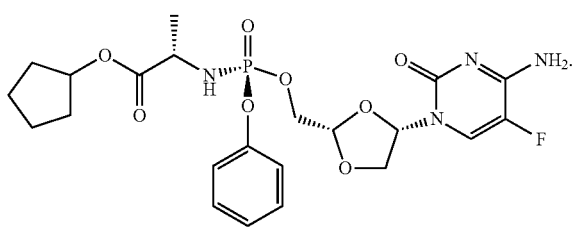

4. A pharmaceutical composition comprising a compound of formula I, according to claim 1, or a pharmaceutically acceptable salt thereof and a vehicle or carrier therefor which is adapted for parenteral administration.

5. A method for the treatment of a leukemia, myelodysplastic syndrome or a lymphoma in a patient comprising parenterally administering to a patient in need thereof an effective amount of a compound of formula I according to claim 1, or a pharmaceutically acceptable salt thereof.

6. The method according to claim 5, wherein the leukemia is AML.

7. The method according to claim 6, wherein the AML is cytarabine resistant and/or presents in a patient ≥60 years of age.

8. The method according to claim 5, wherein the patient is a mammal.

9. The method according to claim 5, wherein the patient is a human.

10. The method according to claim 6, wherein the patient is a human.

11. The method according to claim 7, wherein the patient is a human.

12. A pharmaceutical composition comprising a compound of formula I, according to claim 2, or a pharmaceutically acceptable salt thereof and a vehicle or carrier therefor which is adapted for parenteral administration.

13. A pharmaceutical composition comprising a compound of formula I, according to claim 3, or a pharmaceutically acceptable salt thereof and a vehicle or carrier therefor which is adapted for parenteral administration.

14. A method for the treatment of a leukemia, myelodysplastic syndrome or a lymphoma in a patient comprising parenterally administering to a patient in need thereof an effective amount of a pharmaceutical composition according to claim 12, or a pharmaceutically acceptable salt thereof.

15. A method for the treatment of a leukemia, myelodysplastic syndrome or a lymphoma in a patient comprising parenterally administering to a patient in need thereof an effective amount of a pharmaceutical composition according to claim 13, or a pharmaceutically acceptable salt thereof.

16. The method according to claim 14, wherein the leukemia is AML and is cytarabine resistant and/or presents in a patient ≥60 years of age.

17. The method according to claim 15, wherein the leukemia is AML and is cytarabine resistant and/or presents in a patient ≥60 years of age.

* * * * *